United States Patent [19]

Goldman

[11] 4,154,893
[45] May 15, 1979

[54] PRODUCTION OF THERMOPLASTIC BILLETS AND PREFORMS

[76] Inventor: Conrad Goldman, 298 Hazelwood Ter., Rochester, N.Y. 14609

[21] Appl. No.: 743,636

[22] Filed: Nov. 22, 1976

Related U.S. Application Data

[63] Continuation of Ser. No. 587,968, Jun. 18, 1975, abandoned, which is a continuation of Ser. No. 289,537, Sep. 15, 1972, abandoned.

[51] Int. Cl.² .............................................. B29F 3/10
[52] U.S. Cl. ...................................... 428/375; 264/25; 264/46.1; 264/173; 264/237; 264/245; 264/325; 264/327
[58] Field of Search ................. 264/173, 237, 210 F, 264/210 R, 176 R, 176 F, 25, 26, 245–247, 45.9, 46.1, 327, 325; 428/375

[56] References Cited

U.S. PATENT DOCUMENTS

| | | | |
|---|---|---|---|
| 3,103,409 | 9/1963 | Bohres et al. | 264/327 |
| 3,121,130 | 2/1964 | Wiley et al. | 264/53 |
| 3,359,130 | 12/1967 | Goldman | 264/46.1 |
| 3,379,799 | 4/1968 | Goldman | 264/26 |
| 3,488,747 | 1/1970 | Cleereman | 264/312 |
| 3,608,058 | 9/1971 | Coffman | 264/327 |
| 3,739,052 | 6/1973 | Ayres et al. | 264/92 |
| 3,846,522 | 11/1974 | Goldman | 264/25 |
| 3,857,914 | 12/1974 | Aishima et al. | 264/46.1 |
| 3,956,438 | 5/1976 | Schippers | 264/46.1 |

Primary Examiner—Jeffery R. Thurlow
Attorney, Agent, or Firm—Fred L. Denson

[57] ABSTRACT

Thermoplastic resin is converted to void free billets and preforms, by techniques including: compaction of heated thermoplastic powders: compactionof heated extruded strands: rolling of heated ingots of plastic: simultaneous extrusion and combining of two or more groups of strands: coextrusion of two or more resin formulations: sequential compaction of dual powders: extrusion with differentially heated dies. The billets may be non-homogeneous in response to dielectric heating, to produce controlled temperature zones within the heated polymers, when used as billets and preforms.

9 Claims, 10 Drawing Figures

FIG. 2a
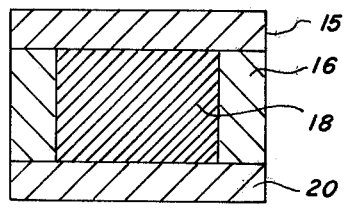
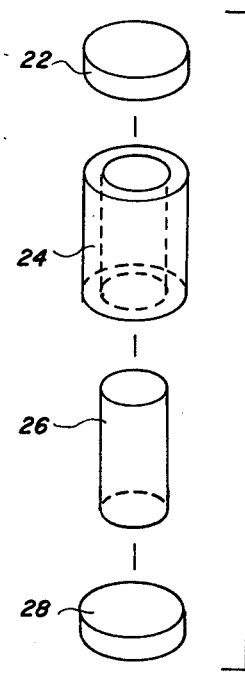
FIG. 2b
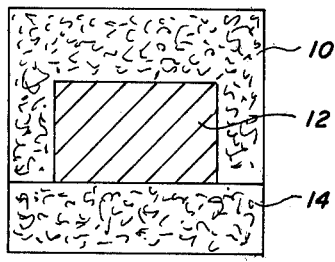
FIG. 1

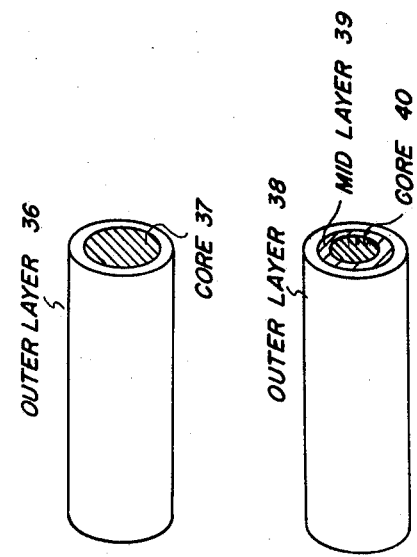
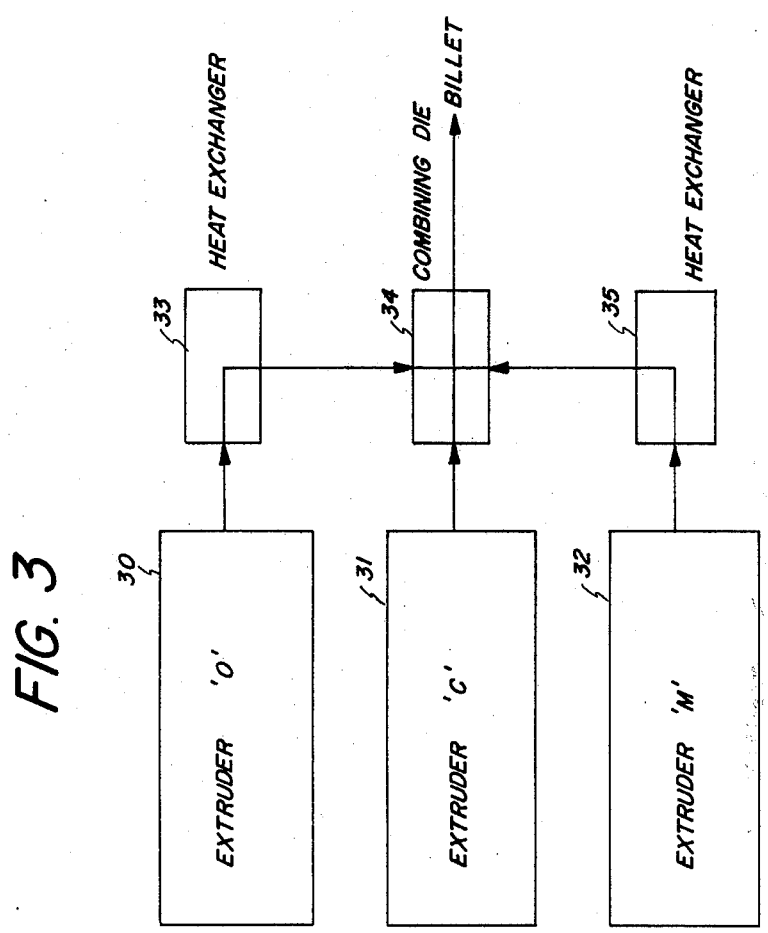
FIG. 3

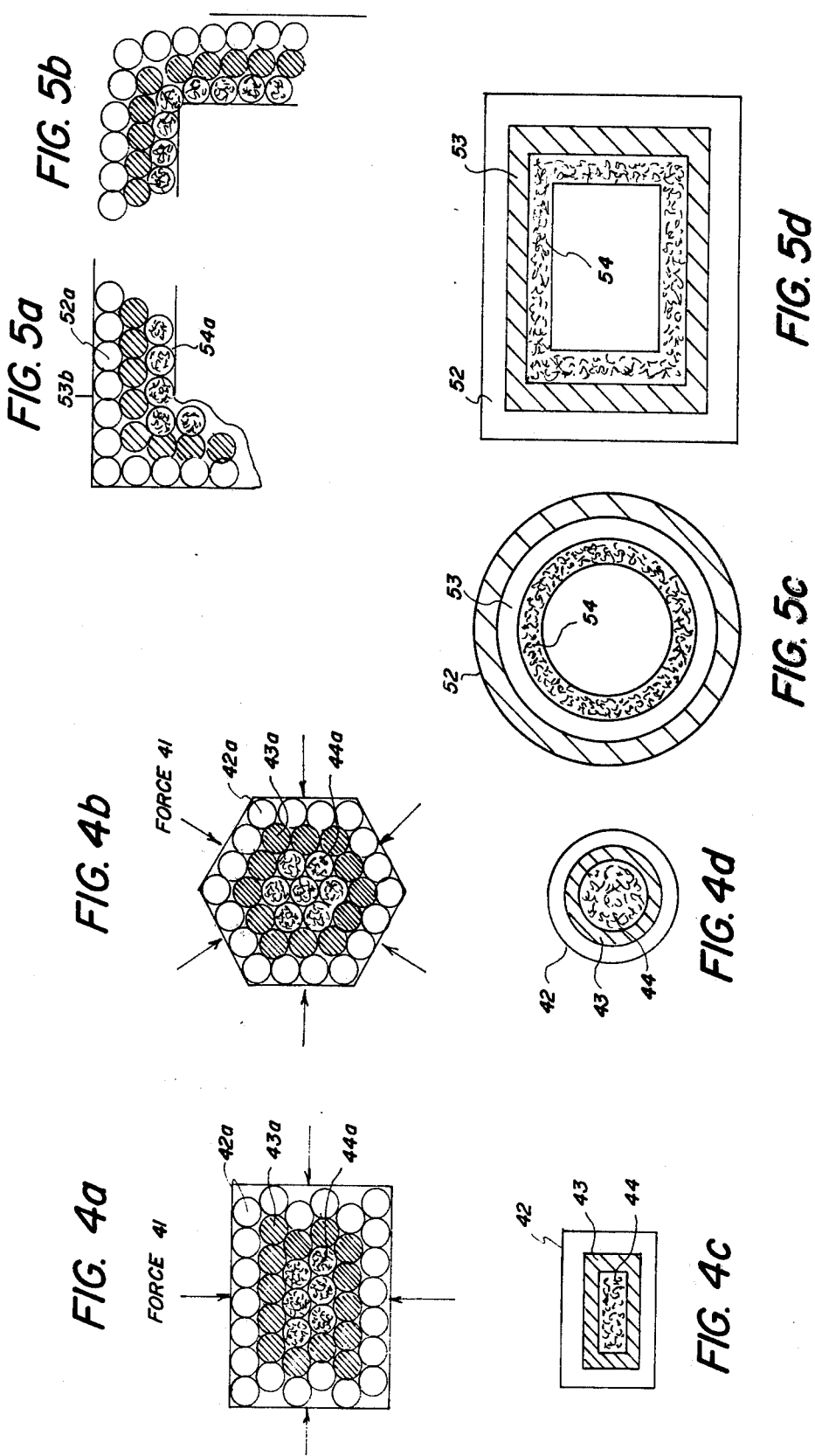

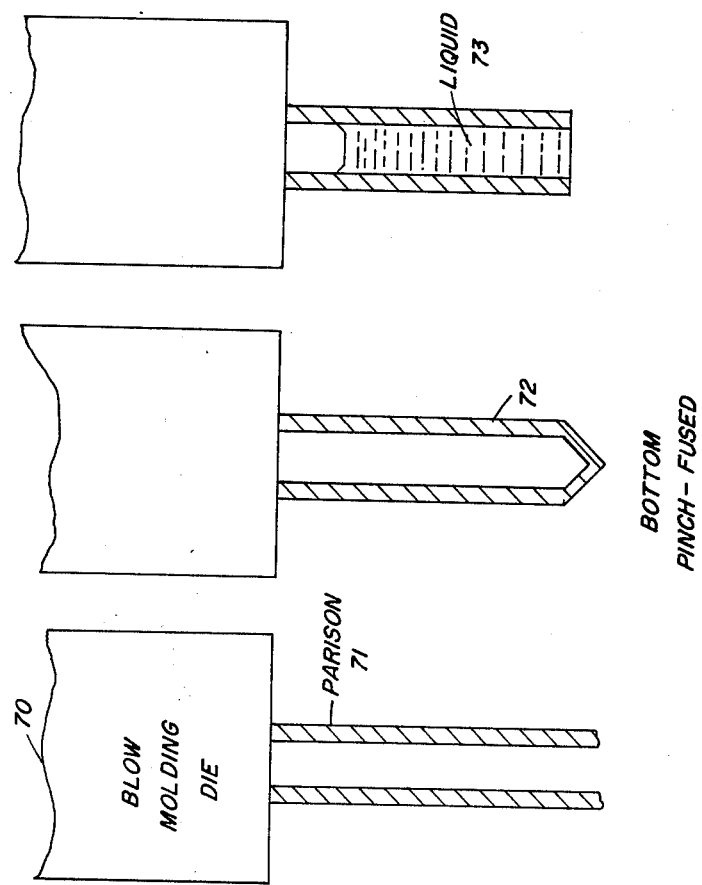

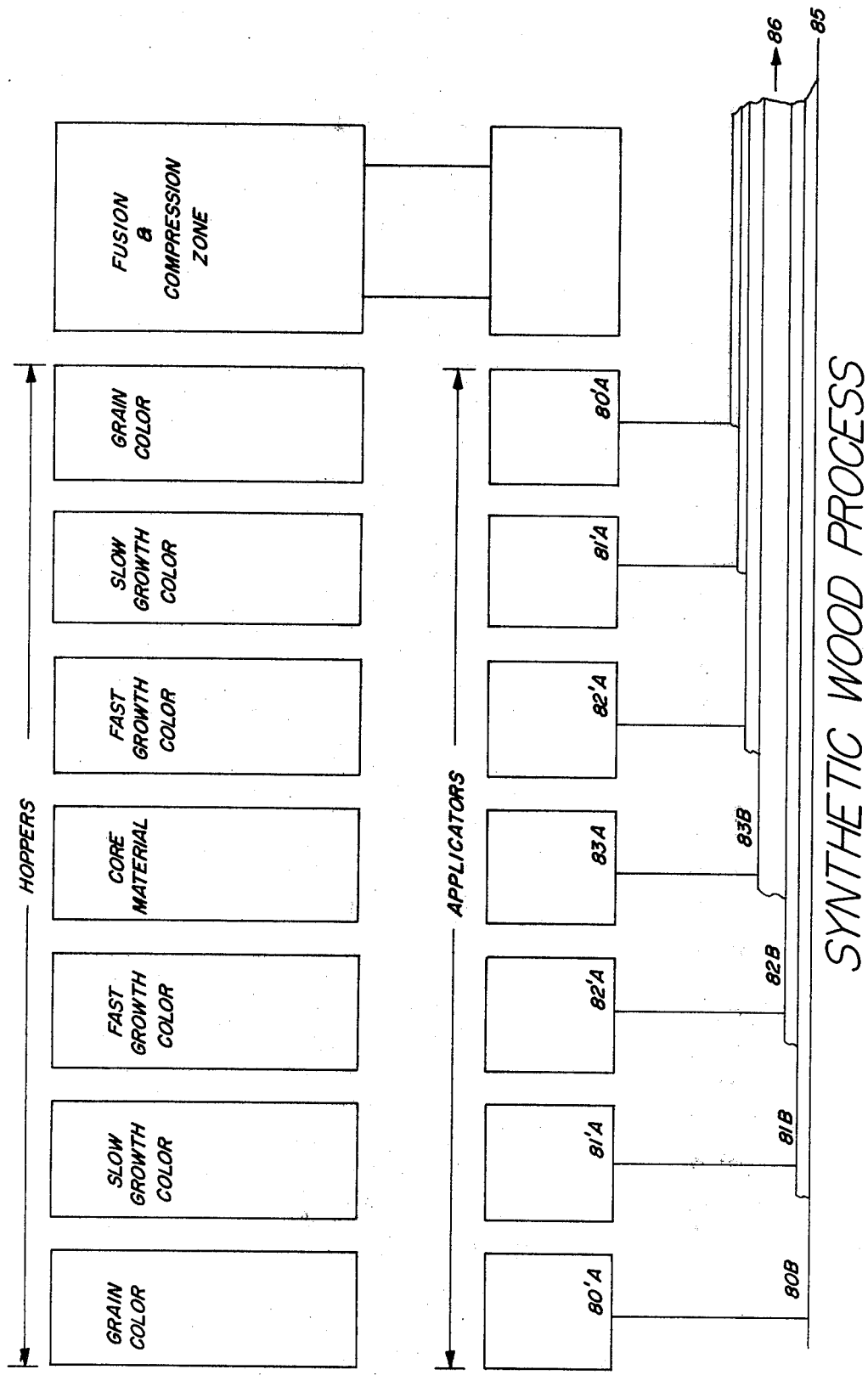

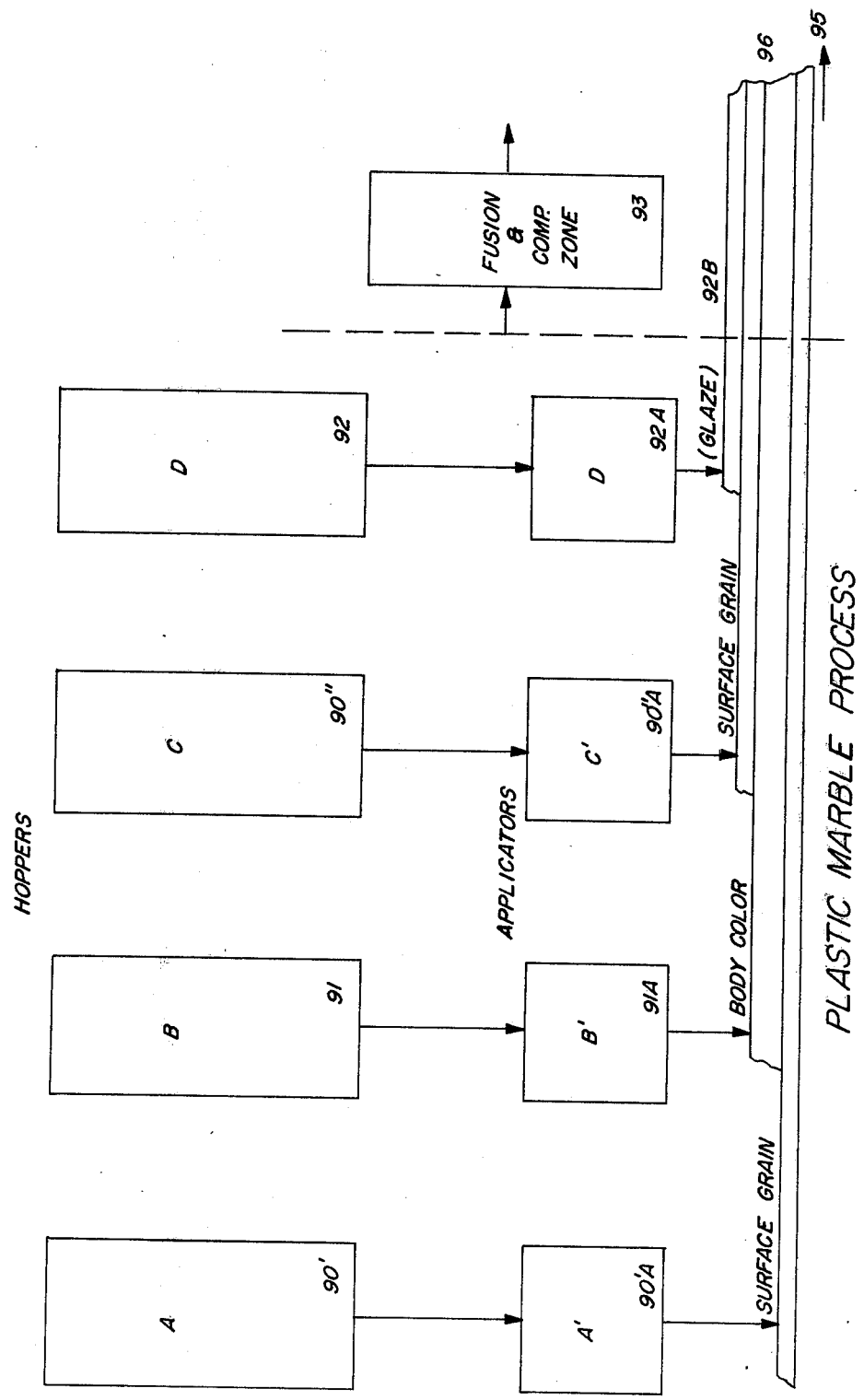

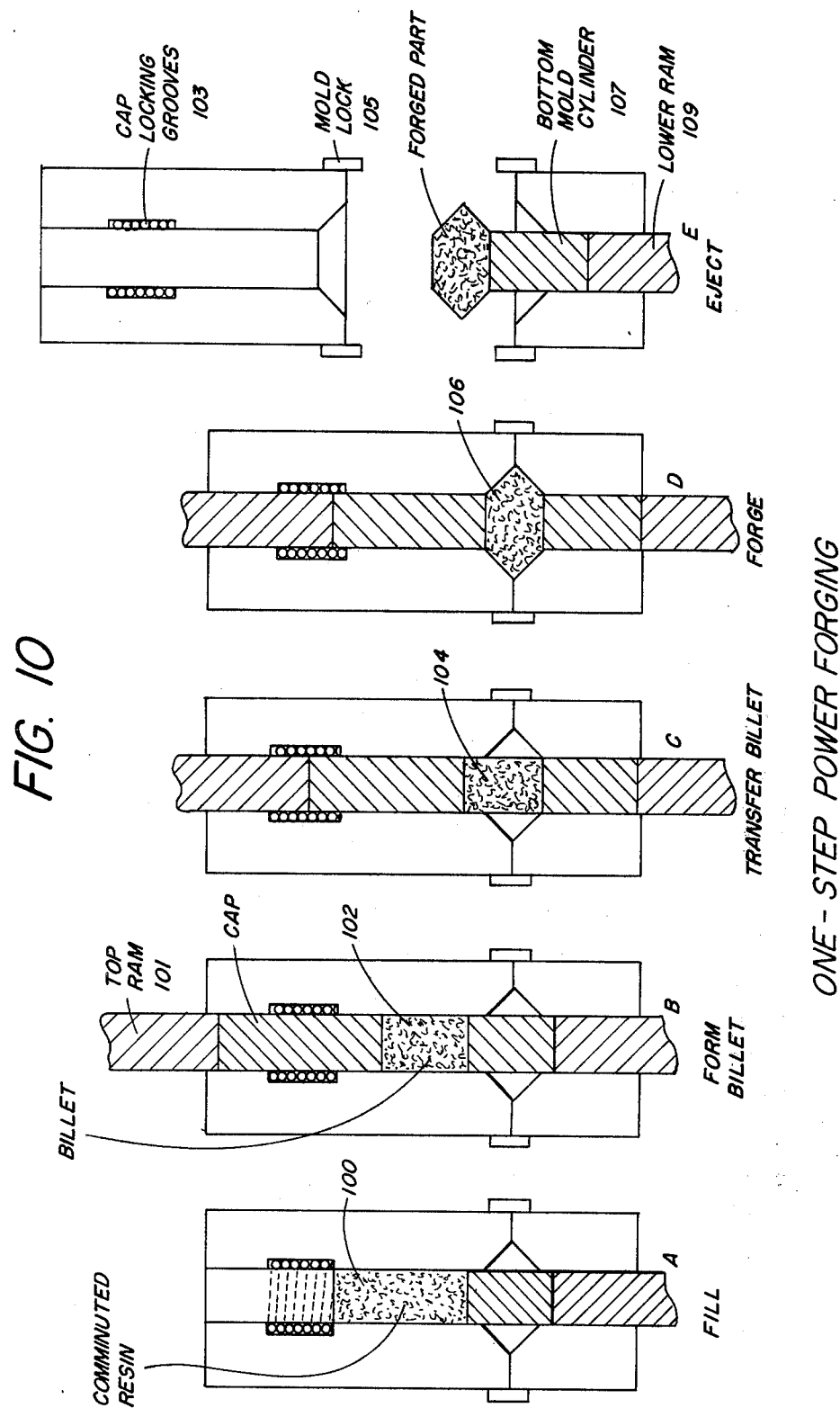

PRODUCTION OF THERMOPLASTIC BILLETS AND PREFORMS

This is a continuation of application Ser. No. 587,968, filed June 18, 1975 now abandoned which is a continuation of Ser. No. 289,537, filed Sept. 15, 1972, now abandoned.

Billets and preforms, as presently produced in the plastic industries, results in materials that are essentially homogeneous from one section to another, within the preform or billet. The distinction between preforms and billets is that preforms are an agglomeration of particles, pressed together into a distinct shape, whereas a billet is a solid mass. Preforms are utilized where the plastic processing will fuse the agglomeration of particles into a fused article-thermosetting resins will fuse in going from the B stage, to the fully cured C stage, with the application of heat and pressure; thermoplastic resins will fuse at temperatures above the melting point of the resin, whereafter they are cooled, to form the shaped article.

In injection molding of thick sections, sink marks are produced, due to the differential rate of cooling between the surfaces against the mold, and the central zone of the molded part. The shrinkage of the inner section, after the outer skin has frozen, causes the sink marks. If shrinkage occurs towards the out side surface, before the inner surface has set, a void can be created in the inner section of the part.

Compression molding of preheated thermoplastics, using uniformly heated preforms would result in shrinkage problems similar to those encountered in injection molding. Dielectric heating of preforms results in the central portion reaching a higher temperature than the outer surface, due to radiation and conduction losses from the surfaces, during dielectric preheating of homogeneous materials.

Transfer molding, from a material heat consideration is similar to that of injection molding, since material is forced through an orifice, fused, cooled from the mold surface inward, with inherent potential for sink marks and voids.

In forging of billets, the cooling problem producing shrink marks and voids, inherent to injection molding, is not experienced, since the billet is notheated above the fusion point, and forged parts do not suffer from these defects: however, surface crazing may occur due to the rapid reshaping of the surfaces in contact with the forging die.

An object of the present invention is to provide preforms that have non-homogeneous, controlled response to dielectric heating, so that the central portions will heat at a slower rate than the outer portions, producing thick compression molded thermoplastics rapidly, without sink marks or voids.

Another object is to provide billets that heat by dielectric heat, to higher temperatures on the outer surface, than the central portion, eliminating crazing of the surface during forging operations.

A further object is to provide preforms from blends of discrete particles that have different physical characteristics and response to Dielectric Heating, so that shrinkage and other properties can be controlled during processing of the particles into an article of commerce.

An object of the invention is to preheat one surface to a higher temperature, while the central portion is heated to a lower temperature, in a uniform Dielectric Field.

Another object is to produce preforms containing two different resins, one on the outer surface of the preform and one in the central portion.

A further object is to produce billets that have an outer segment of resin and an inner portion of another material.

Another object is to produce billets having liquid cores.

An object is to produce billets having different colored resins, to produce wood grain effect, upon forging.

A further object is to produce billets of marble like appearance.

Other objects will become apparent, from the specifications and claims that follow.

In the Drawings:

FIG. 1 represents the components of billets made by sequential compaction of powder.

FIG. 2 represents a method of combining separately produced "standard" billets of various configurations into a single billet, utilizing sequential compaction of powders.

FIG. 3 is a schematic, indicating the use of extruders for producing billets having non-homogeneous properties.

FIG. 4 is a cross-sectional view of billets made by combining extruded strands, into solid configurations.

FIG. 5 is a cross-sectional view of billets made by combining extruded strands into hollow, thick walled configurations.

FIG. 7 represents a method of producing billets by a modified blow molding technique, wherein the billets have a liquid core.

FIG. 8 is a schematic for producing synthetic wood in a continuous process, for use as billets, or as is.

FIG. 9 is a schematic for producing synthetic marble, in a continuous process, for use as billets, or as is.

FIG. 10 represents a one-step forging process, in which the billet is produced during the forging cycle.

Figure 6:
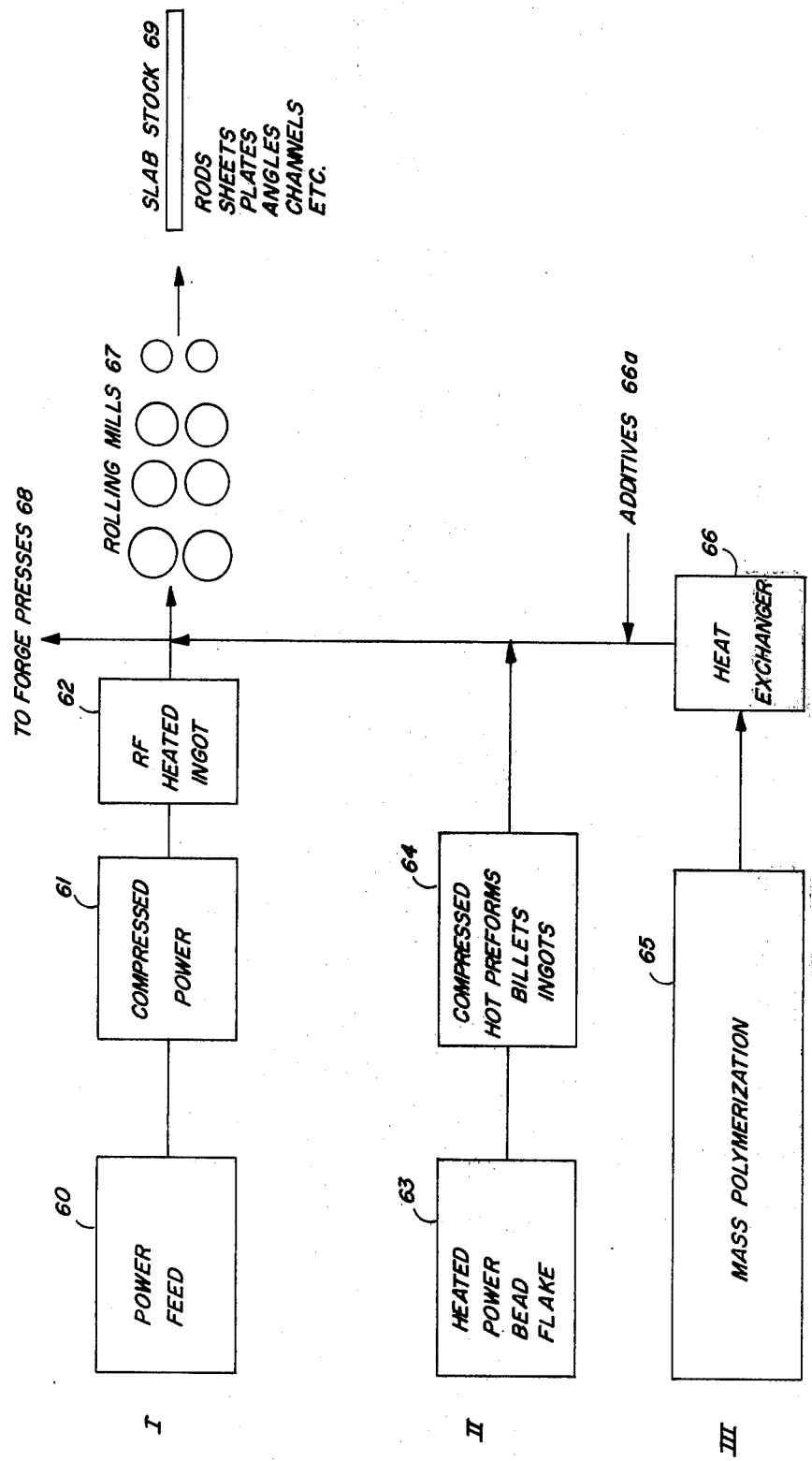
FIG. 6 represents a schematic flow sheet, for producting billets utilizing metal working rolling mills, to shape the final plastic billet.

Preforms have been used for many years, in compression molding of thermosets using well known techniques of compressing small granules and powders, so that they can be handled as tablets of various dimensions, in dielectric heating equipment, then inserted in a heating mold for curing.

Some thermoplastics, such as PVC, can be heated dielectrically, and preforms of PVC can be prepared for compression molding in standard presses, equipped with cooling and heating of the molds, or molds maintained at a prescribed temperature below the fusion point. For thin sections, the process may not be competitive with injection molding, and for thick sections, sink marks would result due to shrinkage of uniformly heated materials. With dielectric heating of homogeneous materials, the central portion would reach a higher temperature than the outer portion, exaggerating the shrink mark effects.

In order to avoid shrink marks during cooling of compression molded parts made of thermoplastics, molded in a conventional two piece mold, the central portion of the preform must be heated to a lower temperature than the outer portion of the preform. This can be accomplished by several techniques. Using standard heating equipment in conjunction with conventional resins, the following procedures may be utilized, to produce the desired effects:

1. Heat the resin particles uniformly before compaction, to below the fusion point, then compact the resin particles into preforms and heat from the outside surface inwardly, using infra-red or circulating air ovens, or other means, including stray field heating by dielectric means. The heated external surface will conduct heat inwardly, raising the temperature of the inner surface to its fusion point, if adequate time and thermal energy be applied from the external source.

2. Heat dielectrically responsive resins, as compacted preforms, to the fusion point at the inner section, followed by external heating of the preform, by infra-red, or other external heating means, including stray field dielectiric heating so that the external surface is hotter than the inner segment.

3. The sequence noted in 2 may be reversed and produce the same effect.

A preferred method is to utilize specially compounded materials, in a variety of geometric configurations, that respond to dielectric heating in the desired manner. The following is a partial list of methods of producing preforms and billets, that have desirable properties, for use in various plastic processing procedures, particularly compression molding, forging and compaction molding, as more fully described in a co-pending application, Ser. No. 70,958 filed Sept. 10/70.

Referring to the drawings, for greater clarity and understanding; where preforms are to be utilized immediately after fabrication—into compression molded parts, the preforms 11, may be made of dual powders; the powders to be utilized for the central portion 12, of the molded part being heated to a lower temperature than the powder utilized for the outer portions 10,14, of the finished part. The inner portion may be heated to temperatures up to 50 degrees F. above the fusion point, while the outer portion should be heated to at least 50 degrees F. above the fusion point, as an example of differential heating of the inner and outer portions of the preforms. Depending on the part being produced, the type of resins used, the geometry of the part, the temperature distribution in relation to the fusion point may be varied according to the heating techniques utilized, and the formulations employed to achieve the desired processing conditions, within the concepts of the disclosure. The powders may be heated by any suitable means, to achieve the desired temperature, including heating in a non-oxidizing atmosphere, to prevent thermal degradation of heat sensitive materials, Dielectric heating may be utilized with dielectrically responsive resins.

The ratio of the central portion 12, to the outer portion 10,+ 14, may vary according to the sizes and mass of the preform and finished molded part (between 10% and 1000%), so that shrinkage is minimized or eliminated, when subjected to thermoplastic molding conditions, in a compression molding press.

The preform may be prepared in stages, 22, 28, 24, 26 to produce a preform having distinct characteristic, which will produce molded parts having preferred properties. For Examples: Referring to FIG. 2A I. The Central Core 26 may be prepared of material heated to a cooler temperature than End Discs, 22 & 28 and Outer Cylinder 24, assembled into a larger preform, and if necessary, repressed into a single composite mass. The core may be composed of dielectrically responsive resin, responsive to a higher or lesser degree than the outer cylinder and end discs, but having essentially the same physical and chemical characteristics. The color of the outer cylinder 24, and end discs 22, 28, may be the same or different, and either or both may be the same or different than the color of the central core 26. The central core may be black, colorless or any other color, without being evident in the final molded part: therefor, scrap, regrind, and off-color materials may be economically employed, without detracting from the basic functions and design of the finished part. The central core 26, may contain highly filled materials, such as diluents, fillers, foamed materials, reinforcing agents, metal or wood inserts, etc., while the visible surfaces, comprising the outer cylinder, 24, and end discs, 22, 28, may contain colorants, antioxidants, light stabilizers, antistatic agents, antiblocking agents, and other additives, utilized to enhance the properties of plastics.

II. Preheated powder 14, may be placed into a cavity to a uniform thickness. A preform (core 12) heated to a lower temperature is deposited atop the layer of heated powder 14, centrally located. Additional preheated powder 10, is deposited in the cavity, surrounding the preform, and covering the preform by a layer equivalent in thickness to the original layer beneath the preform, the combined powder and preform 11, is now subjected to a compacting force to produce a preform having differential thermal characteristics, in the central and outer portions.

The powder may be heated by any convenient means, preferably with benefit of a non-oxidizing atomosphere, or vacuum, to minimize or eliminate oxidation of the powder surfaces. The powder may be colored, while the central preform is not, to economize on the use of colorants. The powder may contain other additives, antioxidants, ultraviolet inhibitors, antistatic agents, antiblocking agents, etc., while the central preform may be devoid of additives not required in the inner portion of the finished article. The central preform may contain fillers, diluents, extenders, reinforcing agents, blowing agents, and other materials to economize or alter the physical characteristics of the finished product.

In place of the central preform 12, compacted scrap, wood fibers, sterilized compressed organic wastes, etc, may be utilized, and covered with the preheated powders.

Fired clays, expanded concrete, slag, foamed thermoset resins may be used, for example, in place of the central preform 12 to produce bi- or multi- component articles, useful to the building trades, etc., having desirable surface characteristics.

One application for billets of this type would be to produce novel building products, having decorative, colored waterproof surfaces.

III. Using extruded pellets as a source of material for billets or preforms from two or more extruders, preforms may be made in a manner similar to that employed using powders as in (I) above, except that the temperature of the pellets is controlled by cooling of the hot extruded pellets, rather than the heating of the powders. Where the preforms or billets are not utilized immediately upon forming, it is desirable to prepare the billets or preforms so that they may be reheated at a later date, in such a manner that the temperature profile results in a void-free, sink-free, formed article. By utilizing materials that respond to a different degree to dielectric heating and possess if desired, different degrees of shrinkage, the billet or preform may be heated in a uniform, or stray field, and reach the desired temperature profile, rapidly and economically.

Billets having an outer layer 36, and core 37, may be made by utilizing two extruders, 30, 31. The extruder processing the resin which forms the outer layer 36, being equipped with an optional heat exchanger 33, so that the resin from extruder 30 may be heated or cooled as desired, before it is combined in a combining die 34, fitted to the extruder 31, which extrudes the core 37 material. As noted above, the combined extrudate, from the combining die 34, producing the billets, should have the central core 37 cooler than the outer layer 36, to control the shrinkage effect, during cooling. The billet may be drawn and rolled, as shown in FIG. 6, item 67, during the cooling process to assure that the billet is void free, and dense, when cooled to room temperature.

The composition of the outer layer, 36 may be more responsive to dielectric heat than the inner core, 37 so that in heating of the billet, for forging, by dielectric means, the outer layer may be heated to a higher temperature than the core material.

As in the billets described above 11, the outer layer 36, may contain antioxidants, U.V. inhibitors, lubricants, reinforcing agents, diluents, expanding agents, colorants, and other modifying agents, similar to, and in like or different concentrations then that contained in the core, 37, material. The core material 37, may contain non-resinous material, such as cementious material, compressed organic wastes, etc., feeding the combining die 34 from a screw-feed mechanism, not shown, in place of extruder 31.

Where a more versatile billet is desired, a triple layered billet, comprising an outer layer 38, a mid layer 39, and a core 40, may be produced, utilizing three extruders, 30, 31, 32, with optional heat exchangers 33, 35, feeding into the combining die 34. For example, the outer layer 38, may be a thermoplastic having low coefficient of friction, the mid layer may be highly reinforced with fiberglass, for strength, while the core may be an expanded polymer, to provide lightness to the finished part. The three separate zones may be varied at will, and may be altered in composition, ratios, geometry, to suit a particular application.

Referring to FIG. 4:

The combining die 34 (FIG. 3) may be utilized to combine extruded strands 42a, 43a, 44a, corresponding to extrudate from extruders 30, 32, 31, respectively. Where the extrudates are of like composition, they should be arranged geometrically, so that the outer strands 42a, are hotter than the mid layer of strands 43a, which is hotter than the core strands 44a, so that upon emerging from a combining zone, whether a combining die 34, or rolling mills, 67, the billets will cool to void free masses. The geometric direction of the forces 41, utilized to combine the masses, above the fusion point, into a composite mass, having temperature gradients from inner to outer section, will determine the shape of the final billet. FIG. 4C and 4D illustrate two simple geometric billet configurations, prepared from extruded strands.

Any desired profile configuration may be attained, by choosing suitable die configurations, or roll configurations, in a rolling mill 67, so that rods, sheets, plates, angles, channels, tees, I's etc. may be produced. The outer mid, and core zones may be similar or different in chemical and physical properties, including densities, color, shrinkage coefficients, responsiveness to dielectric heating, melt index, softening range, abrasion resistance, coefficient of friction, hardness, impact resistance, stiffness, and tensile strength.

By utilizing pipe-type of combining dies 34, hollow billets, as in FIGS. 5C and 5D may be produced, having the properties described above.

Referring to FIG. 6:

Various methods of producing billets, that have shapes similar to cold rolled steel can be envisioned, which employ conventional steel rolling equipment 67 as part of the billet making process.

For example—Powder 60, may be compressed into various geometric shapes 61, as per standard sintered metal techniques, and may include multi component powders, as noted in FIG. 1 and FIG. 2.

The compressed powders may be heated by RF techniques to the fusion point and subjected to sufficient pressure to form fused masses, at or near the fusion range, cooled slowly if desired, and subjected to the action of rolling mills, to produce slab stock, similar to cold rolled iron shapes.

The ingots of plastic may be made by alternate means, comprising the steps of subjecting heated powder, bead or flake, 63 to sufficient force, to produce compressed hot ingots 64. Heated preforms or billets 64 may also be utilized as ingots, if they are to be rolled 67 into slab stock 69.

Where mass polymerization produces molten resin 65, a heat exchanger 66, in the form of extruders, screw conveyors, and other means, may produce the feed stock to be processed through rolling mills 67 to produce slab stock 69. The mass polymerization material 65, may be split into multiple streams, as for example, the three extruders, illustrated in FIG. 3. In addition to the mass polymerized resin, additives 66a may be added to each of the extruders, through the hopper, or in the barrel at suitable entry ports. The extrudates, combined into a single mass, as described above, relative to FIG. 3A may be utilized as ingots, for the rolling mills 67.

The ingots, as described above, may be processed as billets, in forging presses 68, if the material is at or slightly below the fusion range.

Ingots may be prepared from powdered material, heated to just below the fusion point, prior to being fed into a hopper, fitted with a "craming" screw, as used on many hoppers leading to extruders—in this case the hoppers lead to concentric vertical chambers, within a heating zone, so that the preheated powders may be raised in temperature above the fusion point, and fused. Various methods of heating powders are applicable to this embodiment of the invention, and include infra red, hot air, dielectric heating, as more fully described in copending application, Ser. No. 70,958 filed Sept. 10, 1970 and now U.S. Pat. No. 3,846,522.

The outer layer should preferably be more responsive to dielectric heat than the inner layer, so that it may be heated in subsequent usage, in the manner described above.

The wall chambers may be simple geometric shapes, in cross-section, including circles, squares, triangle, rectangles, T's, L's, U's and any configuration normally found in rolled metal stock, such as I beams, angles, channels, as well as heavy walled tubing and pipe configurations. By controlling the rate of withdrawal of the material, which is gravity fed, assisted by a "cramming" screw, the degree of "densification" can be controlled, from 30 to 100% of the resin in its densest forms. In addition, using expanded beads, or foamable beads, lower densities can be reached by this process. Incorporating a blowing agent which foams at the fusion temperature or higher, and processing the ingot accordingly, can result in resins of densities desired.

The ingot may be continuously processed through rolling mills, or it may be cut into desired lengths and processed in units.

When preparing unit lengths, the wall chambers need not be parallel, but may converge, to assist in densification of the resin, in passing from the powder stage, to the denser mass. In addition to the above methods of heating noted, the vertical fusion zone may be made of metal, which is heated by induction, conduction from electrical heating units, or circulating fluids, as is commonly utilized in extrusion equipment.

The concentric chambers may carry two or more concentric streams of powder, using a separate hopper and cramming screw to feed each concentric powder chamber. The chambers need not be concentric, if special configurations are desired. The volume of the cross sections may be varied within broad limits, as for example, the outer zone may be between 10% and 1000% of the inner zone for a two component system.

The hopper feeding the inner zone may be filled with non plastic material, including sawdust, cork, expanded polymers in bead or crumb form, slag, cementious material, sterilized comminuted organic waste, or any other diluent or filler that will produce useful products, when bound by an outer layer of thermoplastic resin, that can preferably be heated by dielectric heat.

IV Referring to FIG. 7:

In blow molding processes, an extruded tube, known as a parison, 71 is usually formed as an integral part of the blow molding cycle. Since an extrusion process is utilized, the dies utilized in other extrusion processes, such as wire coating, or pipe extrusion, can be employed in a modified blow molding technique. In a preferred embodiment of this disclosure, the die is constructed so as to allow fluid to be introduced through the die, into the parison. After the parison 71 is extruded in blow molding die 70, the bottom section of the parison is pinched together, to fuse the parison at that point. The parison may be "blown" into a cylindrical shape, in molds shaped according to the billet configuration desired. A liquid 73, non solvating for the resin of which the blow molded billet is made, is introduced in a specific amount, conforming to the volume of the inside of the finished billet, 75.

In place of air, during the blowing operation, various ingredients may be inserted, including polyurethene foam, foamed thermoplastics, gelled liquids, filled resins, asphalts, thermoplastics, scrap material, plaster, cementious materials, thermoset foams, sand wetted with organic or inorganic media.

The top of the billet is now formed by pinching off the parison 74, and separating the filled billet from the extrudate 71, from the blow molding die. By a suitable pinch off mechanism, the top of the billet may be made flat- or the flattening action may be carried out immediately after severing the billet from the parison 71, in a secondary operation.

In like manner using double, concentric parisons, liquid filled billets having outer and inner cylindrical walls, 77 and concentric bore, may be produced.

When liquid media are utilized the choice will depend on the resin employed, but many liquids are applicable, including gelled hydrocarbons; water, in gelled or ungelled states; polyisobutylenes in viscous, liquid form; uncured elastomers, greases and gels.

A liquid filled billet has certain interesting properties.

For example, when forging a liquid filled billet, the pressure exerted on the billet is transmitted throughout the liquid, which assists in forcing the sides of the billet against the walls of the forging dies. In effect, the forging pressure is from within the billet, as well as from the forging unit. Since orientation of the forging process results in increased strength of the part, articles formed in this manner, will have greater strength than the same part formed by blow molding, or rotational molding. The (gelled) liquid may be removed after the part is formed, to produce hollow, forged parts.

V In forming products having a wood like appearance, certain preferred methods of producing preforms and billets may be employed.

Referring to FIG. 8:

In producing wood grain effects, darker colored resins, (Grain color 80-B) more responsive to dielectric heat may be applied to a continuous carrier 85 along with resins that are less responsive to dielectric heat, (Slow growth color 81B; main wood color or Fast Growth color 82B) and formed into continuous thick sheets, or stock having a rectangular cross section by sintering or other fusion techniques. The continuously produced material may be cut to convenient length. Upon exposure to dielectric heating, and rolling action in metalworking equipment, moldings etc., may be formed, which have an "authentic-grain" appearance, by virtue of the shrinkage of the more highly heated grained areas.

Where the graining effect is to be accentuated, as in mahogany and oak grains, the powdered grain colored material may be preheated to substantially higher temperatures, in spray-drying or other fluid conveyed heating means, preferrably in a non-oxidizing atmosphere, before being applied to the continuous carrier 85. The other resins, applied at temperatures substantially lower than the preheated grain resin, shrink a different amount on cooling, producing the desired grain effect. The effect can be further accentuated by utilizing grain colored resins that have a greater coefficient of expansion (and shrinkage) than the remainder of the resins utilized.

With proper choice of colors in the resins, and smoothness of the rolls of stamping or forming or forging dies—which need not be grained—surface finishing operations can be virtually eliminated. To further add "authenticity" to the grain structure and woodlike appearance, the basic wood color may have a glossy or matte finish, whereas the "grain color" should be a contrasting gloss compared with the basic wood color 82B, depending on the type of wood being reproduced. This can be obtained by proper choice of fillers and additives to the resin, incorporated conveniently along with the colorants, by standard techniques.

VI In forming products having marble like appearance, certain techniques of preparing billets and preforms are especially suitable.

Referring to FIG. 9:

In producing marble-like material from thermoplastics, colored thermoplastic resin, in powder form may be applied from hoppers, via applications 90A, 91A, 92A, to a conveyor belt 95 by methods comprising silk-screen; electrostatic spray, with benefit of shielding masks; rotating etched drums. The continuously produced material may be cut into billets of convenient lengths. The powdered resins may have different melt indices, of essentially the same type of thermoplastic resin, so that when heated to a uniform temperature they will flow at different rates under pressure, producing desirable visual effects. The differently colored powders may be of different particle sizes, as well as having different flow characteristics. Combinations of powders and chips- or pellets, will produce more authentic marble-like qualities, in many instances. Granite and other stone effects may be likewise reproduced. Combinations of transparent and opaque colors may be effectively employed as well as uncolored and colored combinations of resin. The billets or preforms may contain fillers, reinforcing agents, anti-oxidents, light-stabilizers, foaming agents, as well as surface glazes.

In producing differential thermal flow characteristics, materials of a single melt index may be employed, when each differently colored material has been treated to respond to dielectric heat to a different degree... according to the teachings of a copending patent application, Ser. No. 792,933, filed Jan. 22, 1969, and now abandoned and heated by dielectric heat, to different temperatures. The grain resins may be selected from materials that have a greater coefficient of expansion, to produce depressions in the grain area, as the billets are cooled. The billets or preforms having a rectangular cross section may be utilized as is—or coated with cast acrylic resins 92B or other transparent materials having superior light stability and weathering characteristics. The billet forms may be pre-coated with the surfacing material, much as gel coats are applied to polyester-fiberglass structures, by applying the glaze 92B to the carrier 95, then applying the resins atop the glaze coat, instead of in the reverse manner.

Where the marble like structures are to have a non-flat surface the contoured surface may be produced by techniques comprising stamping, compression molding, forging, thermo-forming, roll-embossing; laminating, utilizing adhesives, heat or ultrasonic energy to join the contoured segments to an otherwise flat surface.

VII Billets may be prepared by compaction of preheated powders or pellets, in a first stage of a two or more stage forging die, (not shown). The segments of the die may be thermally insulated, so that in effect, two or more dies are attached to one bolster. The billet forming section of the die may be heated to above the fusion point of the material, so as to fuse the outer surface, when material is presented to the die, at just below the fusion point, where sufficient kinetic energy is applied during the forging cycle, to fuse the mass into a solid article with smooth, well defined surface characteristics.

Since forging, using two piece molds is akin to compression molding, using two piece molds, and transfer molding is a modified compression molding technique, billets may be produced in a modified forging technique akin to transfer molding.

Referring to FIG. 10:

In this case, in place of the transfer pot, where heated resin is plunged through an orifice into a closed mold, powder or pellets 100, may be compressed into a billet 102, transferred into the mold chamber 104, forged 106, and ultimately removed from the mold 108, by a knock-out pin action, in a series of continuous steps, within a single forging cycle.

Although the mechanism of the forging equipment is more sophisticated than a simple forging machine the added cost of the equipment is probably more rapidly amortized than the differential costs incurred in utilizing powder or pellets as a starting material, and utilizing prefabricated billets, which are generally substantially more costly than powder or pellets of the same material formed into billets "in-Situ", during the forging operation.

If the top plunger, or piston or ram 101, is considered to be the billet forming plunger, and bottom plunger, or piston or ram 109, is considered to be the restraining and knock-out plunger, the prime areas of modification in the forging machine design are related to controlling the strokes of the plungers, as well as the diameters of the plungers, to accomodate different billet masses and shapes. The stroke can be controlled, in mechanical forging presses, by the cam design. Utilizing split cams, timing of the stroke can be conveniently adjusted. The final position of the plunger can be controlled by utilizing "caps" on the end of the plunger, having different lengths, when used in conjunction with a specific cam configuration. The diameter of the "cams" will to a degree, determine the mass of the resin being formed into a billet, and forged into a finished article of commerce.

One piston may be mechanically operated, while the other is hydraulically operated, as for example a mechanical billet forming plunger, used in conjunction with an hydraulic restraining-knock-out plunger. Both plungers may be hydraulically operated. The stroke of hydraulic plungers may be controlled in a number of ways, including: controlled volume displacement of the hydraulic fluid; timing of the fluid displacement mechanisms, such as gear pumps, etc; mechanical stops on the plunger stroke; servo-mechanism circuitry to control pressure build-up; photocell control; microswitch control; and adjustable mechanical linkages between a prime plunger and secondary plunger, or extension of the prime plunger.

More detailed drawings and specifications of the locking mechanism, and pressure retaining cap, will be found in co-pending application 70,958, filed Sept. 10, 1970 now U.S. Pat. No. 3,846,522.

In order that the specification maybe clearly comprehended, the following terms are to have meanings that are understood by those skilled in the art. For example: "Ingots" of metal are masses of heated metal, below the melting point, that can be deformed by equipment applying pressure, in controlled directions and amounts, as for example a metal "rolling mill", which reduces relatively large geometric shapes to those having smaller cross-sectional dimensions, and greater length. "Ingots" of plastic are intended to mean masses of heated plastic, below the fusion point, that can be deformed by equipment which applies pressure in controlled directions and amounts, such as, for example a "rolling mill".

Fillers are understood to mean additives to plastic that are generally less expensive than the plastic, and serve the purpose to make the product less expensive, in many cases, Fillers are also utilized to modify the physical properties, such as to stiffen the product, or add body, color or hardness. Clays, carbonates, sawdust, wood pulp, and the like, are common fillers.

Reinforcing agents are understood to mean additives to plastics that improve the physical properties, particularly tensile strength, stiffness and abrasion resistance. Typical reinforcing agents are fiberglass, synthetic fibers, cellulose fiber asbestos fibers and the like.

"Fusion point" is understood to refer to the temperature range of which thermoplastic resins normally fuse together, under pressure. "Slightly below the fusion point" is intended to refer to temperatures at which the resin, although hot, will not fuse when in contact with other particles of like resin, especially while being handled in a powder form, so that it remains free flowing.

Polyolefins—are understood to refer to polyethylenes and polypropylenes, of various grades that are commercially available, and to include specially prepared, dielectrically responsive polyolefins, as noted in co-pending application Ser. No. 792,933 filed Jan. 22, 1969 and now abandoned, where mentioned.

Rolling Mills—are understood to refer to equipment utilized to reduce the cross sectional area of deformable masses by the action of pressure and drawing action, as employed in metal working and related industries.

Core—in the synthetic wood process described, above, refers to the inner segments of the mass, lying below the grain material, generally about 1/16" below the surfaces.

The examples cited illustrate preferred embodiments of the invention, wherein the outer segment of the billet is more readily heated by dielectric heating than the inner segment, in order that the billets may be processed in suitable forging and compression molding equipment to produce articles having excellent surface definition and superior physical properties with little or no shrinkage, when processed into heavy sectioned articles of commerce. Within the concepts disclosed in this invention, it is entirely possible to produce billets having greater responsiveness to dielectric heat in the inner segment of the billet, than the outer segment, as well as to produce billets non homogeneously responsive to dielectric heating, in practically any geometric combination desired, having degrees of responsiveness suited to specific products of interest. As noted above, the billets may consist of combinations of resinous and non resinous materials, where the resinous materials may be thermoplastic, thermoset, and combinations of the two. Single and double walled liquid filled resinous billets, wherein the resins may be colored, filled, reinforced and otherwise modified are also within the scope of the invention.

Thermoset resins: refer to resinous materials that cure with heat, and often pressure, and cannot be reshaped by reheating. Included in the category of thermoset resins, as understood in this disclosure, are: phenolics, melamine-formaldehydes, ureaformaldehydes; chemically cured resins, such as epoxies, polyesters and polyurethanes; cross linked elastomers, cross linked polyolefins and polystyrenes and other normally thermoplastic resins that are cross linkable by conventional crosslinking agents, including peroxides, divinyl benzene, and doubly unsaturated compounds.

Bolster: is understood to refer to a part of a forging machine to which is attached the forging dies, in standard forging equipment. "Caps", as understood in this disclosure, refer to removable and interchangeable machinery components, which alter the length or base diameter of a piston, ram or plunger, so that various sizes and masses of resin may be processed in the equipment of which the caps are a part.

Billets: are coherent masses of plastic suitable for forging at temperatures slightly below the fusion point. (Billets may be used as preforms, when heated above the fusion point and compression molded.)

Preforms are agglomerations of particles, which lack physical strength until heated above the fusion point and molded. (Preforms may be readily converted to billets by heating above the fusion point then cooling)(Preforms may also be forged directly, if sufficient energy is imparted by the forging process to fuse the mass at or near the fusion point.)

Although illustrative embodiments of the invention have been described in detail herein, with reference to the accompanying drawings, it is to be noted that the invention is not limited to such precise embodiments, and that various changes and modifications may be effected therein without departing from the scope or spirit of the invention.

What is claimed is:

1. A process for producing a thermoplastic resin billet free of voids due to thermal shrinkage having an outer segment which is responsive to dielectric heating and an inner segment which is less responsive to dielectric heating than the outer segment comprising the steps of:
   a. extruding a first stream of thermoplastic resin which is responsive to dielectric heating,
   b. cooling the extruded first stream to a temperature which is above the fusion point of the thermplastic resin,
   c. extruding a second stream of thermoplastic resin which is less responsive to dielectric heating than said first stream of thermoplastic resin,
   d. cooling the extruded second stream to a temperature which is lower than the temperature of said first stream,
   e. concentrically combining the cooled first and second streams to form a thermoplastic billet free of voids due to thermal shrinkage in a manner such that the cooled first stream comprises the outer segment of said billet and the cooled second stream comprises the inner segment of said billet.

2. A process according to claim 1, in which the inner of two concentric streams is extruded at a lower temperature than the outer of the two concentric streams.

3. A billet, produced according to claim 1, in which the volume of the inner of the two concentric streams is between 10% and 1000% of the volume of the outer concentric stream.

4. A process according to claim 1, in which the shrinkage of the outer concentric stream is equal to or greater than the shrinkage of the inner concentric stream.

5. A billet, produced according to claim 1, in which the inner concentric stream has different physical and chemical properties than the outer concentric stream.

6. A billet, produced according to claim 1, in which the outer segment has a different color than the inner segment.

7. A billet, produced according to claim 1, in which the inner segment contains a thermoplastic of lower density than the outer segment.

8. A billet, produced according to claim 1, in which the inner and outer segments are different resins.

9. A billet, produced according to claim 1, in which the inner segment is filled resin, while the outer segment is unfilled.

* * * * *